A. L. BUTLER.
ROAD SCRAPER.
APPLICATION FILED JULY 15, 1920.
1,382,470.
Patented June 21, 1921.
2 SHEETS—SHEET 1.
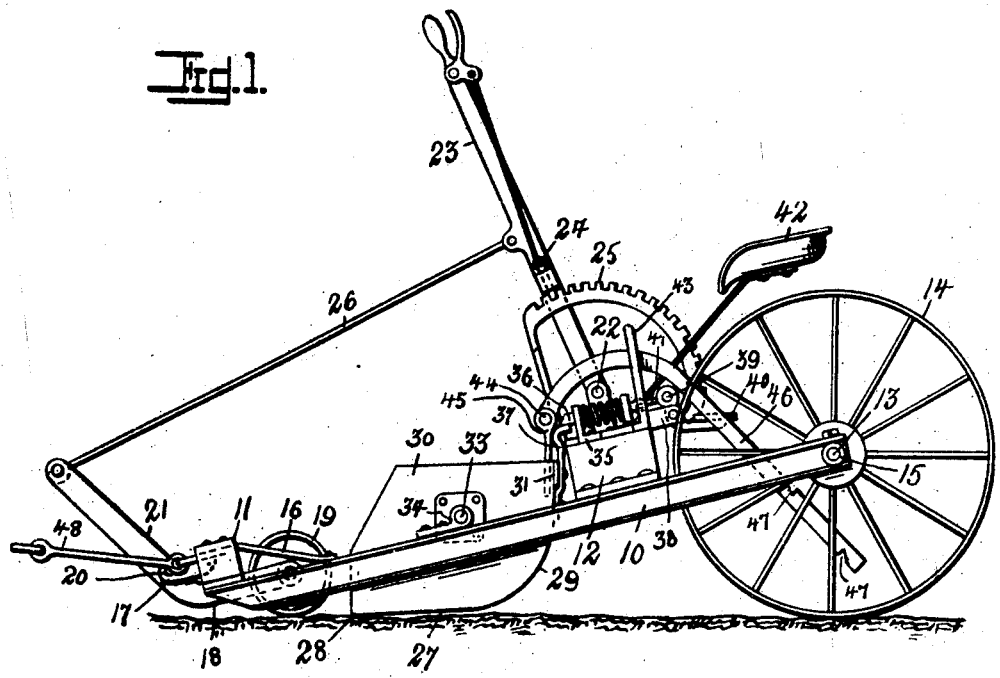
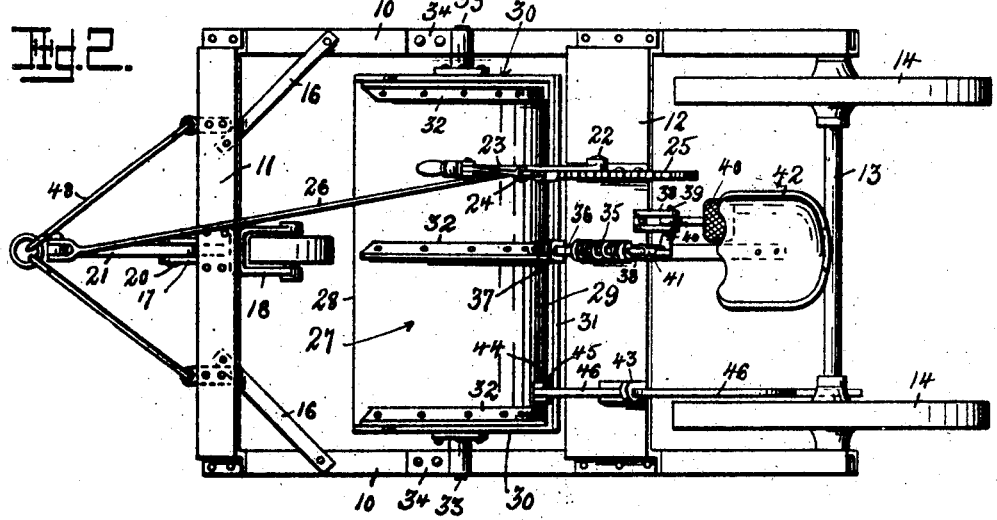
Inventor
A. L. Butler,
By Geo. P. Kimmel
Attorney

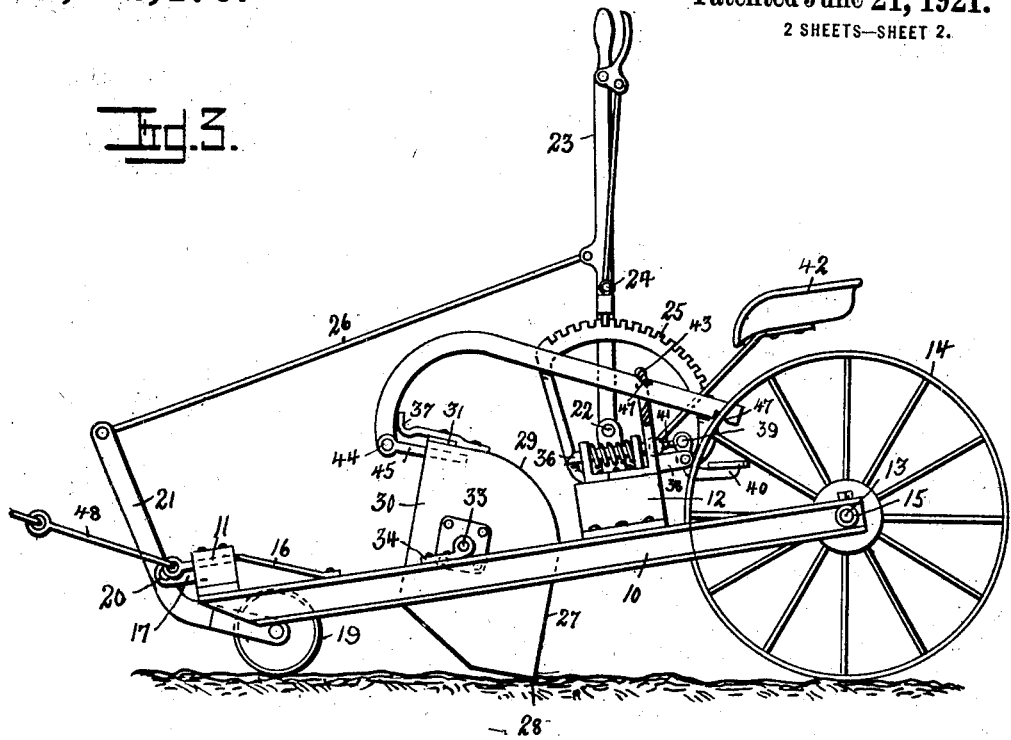
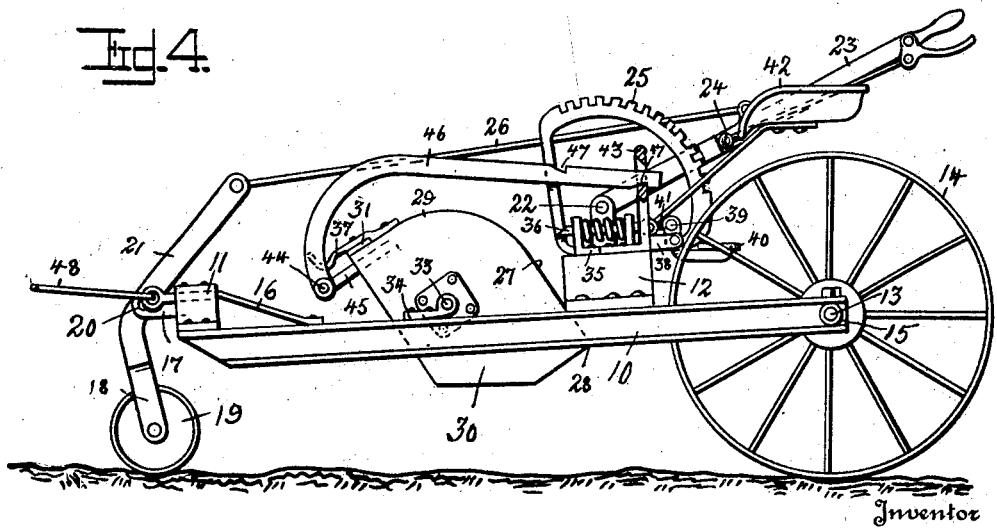

UNITED STATES PATENT OFFICE.

ALVA L. BUTLER, OF UCON, IDAHO.

ROAD-SCRAPER.

1,382,470.  Specification of Letters Patent.  Patented June 21, 1921.

Application filed July 15, 1920. Serial No. 396,459.

*To all whom it may concern:*

Be it known that I, ALVA L. BUTLER, a citizen of the United States, residing at Ucon, in the county of Bonneville and State of Idaho, have invented certain new and useful Improvements in Road-Scrapers, of which the following is a specification.

This invention relates to combined earth scrapers or scoops and load carrying and dumping devices, and has for one of its objects to improve the construction and increase the efficiency and utility of devices of this character.

Another object of the invention is to produce a device of this character having means for holding the scraper and scoop at various angles relative to the supporting frame, to enable it to be applied to various forms of work such as scraping or scooping, leveling or spreading the earth after scraping, or dumping and "diking" or spreading the earth in sloping position.

With these and other objects in view, the invention consists in certain novel features of construction as hereinafter shown and described and then specifically pointed out in the claims, and in the drawings illustrative of the preferred embodiment of the invention.

Figure 1 is a side elevation of the improved apparatus arranged for scraping or scooping.

Fig. 2 is a plan view with the parts arranged as in Fig. 1.

Fig. 3 is a view similar to Fig. 1, with the parts arranged for spreading or leveling.

Fig. 4 is a view similar to Fig. 1, with the parts arranged for "diking" or arranging the earth on slopes or embankments.

The improved device includes a supporting frame having spaced side members 10, a forward transverse member 11 and an intermediate transverse member 12. The axle 13 for the carrier wheels 14 is journaled in the side members 10, one of the bearings for the axle being represented at 15.

The frame members 10 are preferably constructed of channel metal, while the transverse members 11 and 12 are of plate metal, preferably steel, and united by riveting or the like, the joints between the forward plate and the side frame members being reinforced by oblique braces 16.

Attached to the forward transverse member 11 is a bracket 17 in which a support or hanger for a caster wheel 19 is pivoted at 20 the support being extended forwardly as shown at 21.

Pivoted at 22 to the transverse member 12 is an operating lever 23 having a pawl device 24 coacting with a toothed segment 25 also attached to the member 12.

A pull rod 26 is connected to the lever 23 and to the extension 21 of the caster wheel support, as shown.

By this means the caster wheel support may be adjusted upon the bracket 17, to hold the caster wheel at various elevations to control the position of the forward end of the frame, as hereafter explained.

Disposed between the frame members 10 and between the transverse members 11 and 12 is a combined scraper and load carrier comprising a flat bottom 27 having a forward cutting edge 28, an upwardly curving rear wall 29 and end members 30. The upper portion of the rear wall 29 is reinforced by a strap 31, while the bottom rear and end portions are reinforced by L bars 32, as shown.

Attached to the end members 30 are journals or studs 33 rotatively engaging in bearings 34 on the frame members 10. By this means the combined scraper or scoop and load carrier may be tilted or overturned as required.

Attached to the transverse member 12 is a bracket 35 through which a spring controlled bolt 36 is slidably disposed, and attached to the rear wall 29 of the scraper is a catch device 37 over which the forward end of the bolt 36 engages when the scraper is disposed with its longitudinal axis substantially in alinement with the longitudinal planes of the frame members 10.

The catch 37 and bolt 36 thus coact to hold the scraper in scraping position and in load carrying position, as hereafter explained.

Mounted upon the member 12 is a bracket 38, and pivoted at 39 in the bracket is a treadle lever 40 connected by a pull rod 41 to the bolt 36.

The driver's seat is represented at 42 of the usual construction, and the foot treadle 40 and lever 23 are in convenient position for operation by the driver from the seat.

Supported upon the member 12 is another bracket 43 having an opening or slot therein, and pivoted at 44 upon a standard 45 attached to the rear wall 29 of the scraper is a bar 46 preferably curved and slidable through the opening in the bracket 43. The bar 46 is provided with a plurality of notches 47 to receive the material of the bracket 43 and thus hold the bar in different positions to hold the scraper in different positions, as shown in Figs. 3 and 4.

Pull rods 48 are attached to the member 11, to which the draft animals, tractor or other power is connected, the latter not being shown, as it forms no part of the present invention.

When the apparatus is being transported or when the scraper is carrying its load, the lever 23 will be drawn rearwardly to dispose the caster wheel in its downward position and thus elevate the frame and the scraper carried thereby, with the catch 37 engaged by the bolt 36 which holds the scraper either in scraping or scooping position or load carrying position.

When the device is to be employed as a scraper or scoop, the lever 23 is moved to its forward position, as shown in Fig. 1, thus moving the caster wheel to its rearward position and lowering the forward end of the frame and disposing the scraper in scraping or scooping position, and held rigidly in that position by the coaction of the catch 37 and bolt 36.

When the scraper has received its load, the lever 23 is drawn rearwardly and the caster wheel support thereby depressed to elevate the frame and scraper, as before described, but the bolt 36 is not released at this time. The apparatus is then moved to the place where the load is to be dumped, and the bolt 36 withdrawn by the pressure of the driver's foot upon the treadle 40, thus releasing the scraper which may be easily overturned and the load discharged.

If the apparatus is employed only to excavate the earth and carry its load to the dumping or discharging ground, the apparatus with the forward end of the frame and scraper in elevated position is returned to the place of excavation and the operation repeated.

If the apparatus is to be employed to spread or level the excavated and dumped earth, the bolt 36 is released and the caster wheel and scraper disposed in the position shown in Fig. 3, which movement will draw the bar 46 through the opening in the bracket 43 until one of the notches 47 is engaged by the material of the bracket 43, and thus locks the scraper in the required position, or with the bottom 27 of the scraper substantially vertical.

If the apparatus is to be employed for "diking" or forming embankments, the scraper is tilted with the bottom 27 inclined rearwardly, as shown in Fig. 4 which position can be maintained by utilizing another of the notches 47 in the locking bar 46, and by increasing the number of the notches, the angular positions at which the scraper may be held may be increased, as will be obvious.

It will also be obvious that the caster wheel support may be adjusted to any required extent within the range of the teeth of the segment 25, to control the depth of cut of the scraper.

The preferred embodiment of the invention is disclosed in the drawings and set forth in the specification, but it will be understood that any modifications within the scope of the claims may be made in the construction without departing from the principle of the invention or sacrificing any of its advantages.

What I claim is:

1. In a wheeled scraper, a supporting frame and carrier wheels, a support carrying a caster wheel and adjustable vertically relative to said frame, a combined scraper and scoop swingingly connected to said frame, means under the control of the operator for adjusting said caster wheel support to elevate and depress the frame, a spring controlled catch for holding said scraper in scraping position and in load carrying position, and means for holding said scraper in various angular positions relatively to the frame.

2. In a wheeled scraper, a supporting frame and carrier wheels, a support carrying a caster wheel and adjustable vertically relative to said frame, a combined scraper and scoop swingingly connected to said frame, and means under the control of the operator for adjusting said caster wheel support to elevate and depress the frame, to correspondingly control the elevation of the frame and combined scraper and load carrier.

3. In a wheeled scraper, a supporting frame and carrier wheels, a support carrying a caster wheel and adjustable vertically relative to said frame, a combined scraper and scoop swingingly connected to said frame, and a spring controlled catch device for holding said combined scraper and load carrier in scraping or load carrying position.

4. In a wheeled scraper, a supporting frame and carrier wheels, a support carrying a caster wheel and adjustable vertically relative to said frame, a combined scraper and scoop swingingly connected to said frame, and means for holding said scraper at various angular positions relative to said frame.

5. In a wheeled scraper, a supporting frame and carrier wheels, a support carrying a caster wheel and adjustable vertically relative to said frame, a combined scraper and scoop swingingly connected to said frame, a guide device carried by said frame, and a holding bar connected to said combined scraper and carrier and slidable through said guide device, said bar having a plurality of notches to engage the guide device to hold the combined scraper and carrier at various angles relative to said frame.

6. In a wheeled scraper, a supporting frame and carrier wheels, a combined scraper and scoop swingingly connected to said frame, a guide device carried by said frame, and a holding bar connected to said combined scraper and carrier and slidable through said guide device, said bar having a plurality of notches to engage the guide device to hold the combined scraper and carrier at various angles relative to said frame.

In testimony whereof I affix my signature hereto.

ALVA L. BUTLER.